US010850801B2

(12) United States Patent
Wiegel et al.

(10) Patent No.: US 10,850,801 B2
(45) Date of Patent: Dec. 1, 2020

(54) E-CLUTCH FOR PEDELEC BICYCLE

(71) Applicant: Flex Ltd., Singapore (SG)

(72) Inventors: Christopher D. Wiegel, Santa Clara, CA (US); Shaily Deva, Saratoga, CA (US); Neal Saiki, Santa Cruz, CA (US)

(73) Assignee: Flex Ltd., Singapore (SG)

( * ) Notice: Subject to any disclaimer, the term of this patent is extended or adjusted under 35 U.S.C. 154(b) by 224 days.

(21) Appl. No.: 16/165,079

(22) Filed: Oct. 19, 2018

(65) Prior Publication Data

US 2019/0176930 A1 Jun. 13, 2019

Related U.S. Application Data

(60) Provisional application No. 62/595,924, filed on Dec. 7, 2017.

(51) Int. Cl.
| | | |
|---|---|---|
| *B62M 6/50* | (2010.01) | |
| *B62M 6/90* | (2010.01) | |
| *B60L 58/12* | (2019.01) | |
| *B62M 6/45* | (2010.01) | |
| *F16D 41/24* | (2006.01) | |
| *B62M 9/00* | (2006.01) | |
| *B62M 6/70* | (2010.01) | |

(52) U.S. Cl.
CPC ............... *B62M 6/50* (2013.01); *B60L 58/12* (2019.02); *B62M 6/45* (2013.01); *B62M 6/90* (2013.01); *F16D 41/24* (2013.01); *B60L 2220/16* (2013.01); *B62M 6/70* (2013.01); *B62M 9/00* (2013.01)

(58) Field of Classification Search
CPC ...... B60L 15/2009; B60L 50/20; B60L 58/12; B60L 2200/12; B60L 2200/16; B60L 2240/423; B60L 2240/425; B60L 2260/24; B62M 6/45; B62M 6/50; B62M 6/70; B62M 6/90; B62M 9/00; F16D 41/24
See application file for complete search history.

(56) References Cited

U.S. PATENT DOCUMENTS

| | | | | |
|---|---|---|---|---|
| 5,512,022 | A * | 4/1996 | Suzuki | B60K 1/02 475/2 |
| 5,860,487 | A * | 1/1999 | Tanaka | B62M 6/60 180/206.5 |
| 6,320,336 | B1 * | 11/2001 | Eguchi | B60L 15/2009 318/139 |
| 2004/0231905 | A1 * | 11/2004 | Kurita | B60L 15/2009 180/206.5 |
| 2012/0083954 | A1 * | 4/2012 | Aoki | B60L 7/12 701/22 |
| 2013/0054065 | A1 * | 2/2013 | Komatsu | B62K 23/02 701/22 |

(Continued)

*Primary Examiner* — Anshul Sood
(74) *Attorney, Agent, or Firm* — Sheridan Ross P.C.

(57) ABSTRACT

A pedal-electric bicycle utilizes an e-clutch to prevent a motor of the pedal-electric bicycle that is fixedly engaged to a drivetrain of the pedal-electric bicycle from resisting movement of the drivetrain when the motor is not transferring power to the drivetrain. The e-clutch causes the motor to operate at a minimum torque level to overcome the internal resistance thereof. The use of an e-clutch beneficially enables the elimination of a mechanical motor clutch, thus reducing complexity, cost, and weight of the pedal-electric bicycle.

20 Claims, 5 Drawing Sheets

(56) References Cited

U.S. PATENT DOCUMENTS

| | | | |
|---|---|---|---|
| 2014/0166386 A1* | 6/2014 | Arimune | B62M 6/45 |
| | | | 180/206.3 |
| 2016/0159434 A1* | 6/2016 | Huang | B62M 6/45 |
| | | | 701/67 |
| 2016/0332695 A1* | 11/2016 | Kimmich | B62M 6/50 |
| 2017/0021896 A1* | 1/2017 | Tsuchizawa | B62M 6/45 |
| 2017/0106866 A1* | 4/2017 | Schieffelin | B60W 10/11 |
| 2017/0183057 A1* | 6/2017 | Gibbings | B62M 6/55 |
| 2018/0009503 A1* | 1/2018 | Kinpara | B62M 6/50 |
| 2018/0154982 A1* | 6/2018 | Gong | B62M 11/14 |
| 2020/0010145 A1* | 1/2020 | Lisanti | B62M 6/60 |

\* cited by examiner

E-CLUTCH FOR PEDELEC BICYCLE

CROSS REFERENCE TO RELATED APPLICATIONS

The present application claims the benefit of and priority to, under 35 U.S.C. § 119(e), U.S. Provisional Application Ser. No. 62/595,924, filed on Dec. 7, 2017 and entitled "E-Clutch for Pedelec Bicycle." The entire disclosure of the foregoing application is hereby incorporated by reference, in its entirety, for all that it teaches and for all purposes.

FIELD

The present disclosure is generally directed to bicycle propulsion systems, and more particularly to electrically-powered bicycle propulsion systems.

BACKGROUND

Pedal Electric Cycles (pedelecs) have become a popular means for transportation. Pedelecs have traditional bicycle pedals but are also equipped with an electric motor that is configured to assist in the propulsion of the bicycle. The motor support level for a pedelec is controllable in the range from no support to maximum support. A mechanical "pedal clutch" and a mechanical "motor clutch" are used to engage and disengage the pedals and the electric motor from the bicycle drivetrain. For example, if the user is pedaling without motor support, the pedal clutch is engaged and the motor clutch is disengaged. If the user is pedaling with motor support, both the pedal clutch and the motor clutch are engaged. If the user is back-pedaling, both clutches are disengaged. If the user is coasting on the pedelc, then both clutches are disengaged. Thus, the motor clutch allows the motor to be disengaged from the drivetrain when the motor is off or when the drivetrain is moving faster than the motor, so that the motor does not provide additional and unnecessary resistance to the drivetrain and so that the motor does not push the user's feet by driving the pedals.

A moped has both pedals and a motor, but in contrast to a pedelec, a moped can be driven solely by the motor, without any pedaling by the user. Mopeds may thus be operated as a bicycle, as a motorcycle, or as a pedelec (e.g. a bicycle with motor support).

SUMMARY

The mechanical motor clutch of known pedelecs adds to the complexity, cost, and weight of the pedelec. Embodiments of the present disclosure eliminate the need for a mechanical clutch between the motor and drivetrain on a pedelec. More specifically, the present disclosure describes an alternative e-clutch that, instead of mechanically disengaging the motor from the drivetrain, operates the motor just enough to overcome the motor's own internal resistance (which resistance results, e.g., from the magnetic attraction between the rotor(s) and stator(s) of the motor) when the motor is not being used to propel the pedelec. Thus, as long as there is a minimal amount of power remaining in the pedelec battery, the e-clutch ensures that the rider does not have to overcome the motor's resistance through his or her pedaling efforts. In other words, although the motor remains engaged with the pedelec drive train even when not being used to support the user's pedaling efforts, the rider does not "feel" any resistance from the motor, because the motor is still being operated at a setting sufficient to overcome the motor's internal resistance.

DETAILED DESCRIPTION

Embodiments of the present disclosure will be described in connection with an e-clutch for a pedal electric bicycle. The terms pedelec, bicycle, and cycle are all used interchangeably herein to refer to a pedal electric bicycle (e.g., a bicycle that comprises both pedals and an electric motor for propelling and/or assisting in the propulsion of the bicycle). The term "traditional bicycle" is used to refer to a bicycle that does not comprise an electric motor.

Figure 1:
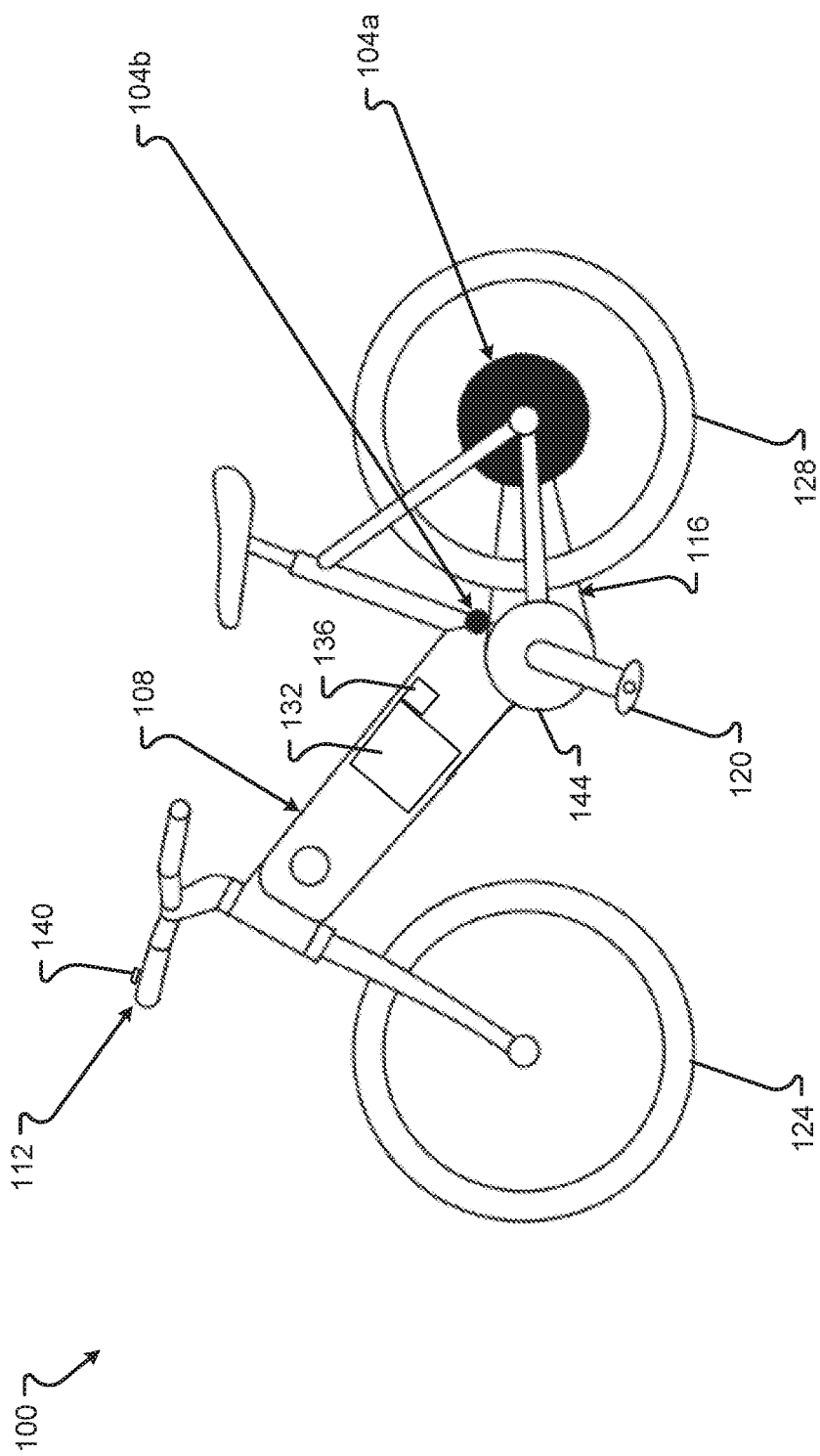
FIG. 1 shows a pedelec in accordance with embodiments of the present disclosure.

FIG. 1 shows a pedelec 100 according to embodiments of the present disclosure. The pedelec 100 may be generally constructed like a traditional bicycle, with a frame 108, handlebars 112, a front wheel 120, a rear wheel 128, pedals 120, and a drivetrain 116. The drivetrain 116 may comprise, for example, a chain that transfers force from one or more power input systems (e.g., pedals, electric motor) to one or more gears in force-transmitting communication with the drive wheel of the pedelec (e.g., the rear wheel). In some embodiments, a power transmission device other than a chain may be used. Also in some embodiments, the front wheel of the pedelec may be the drive wheel. Embodiments of the present disclosure may also be used with tricycles or quadricycles, which may have more than one drive wheel.

The pedelec 100 also comprises a motor 104 in force-transmitting communication with the drivetrain 116. The motor 104 may be any electric motor suitable for use on a bicycle. The motor 104 may be an AC motor or a DC motor. The motor 104 may also be a brush or brushless motor. The motor 104 may be a slotted or slotless motor. Generally, the motor 104 has a lower horsepower output, as larger horsepower motors are both bigger and heavier and not necessarily suitable for inclusion on this pedelec 100. However, the present disclosure does not impose any constraints on the horsepower output of the motor 104. In some embodiments, the motor 104 may be a three-phase, direct current, brushless, slotless outrunner style motor. In some embodiments, the motor 104 may be a direct drive motor, while in other embodiments the motor 104 may comprise or utilize a gearbox to achieve an output rotations per minute (RPM) that is different than the operating RPM of the motor 104 itself. Such a gearbox may also be used to enable the motor 104 to provide greater or lesser torque to the drivetrain 116 and/or to the rear wheel 128.

Two alternative positions for the pedelec motor 104 are illustrated in FIG. 1. In some embodiments, a motor 104a may be included in the hub of the rear wheel 128. When positioned in the hub of the rear wheel 128, the motor 104a may be configured to transfer power to the drivetrain 116

(e.g., so as to drive the rear wheel 128 via the drivetrain 116), or may be configured to transmit power to the rear wheel 128 through a path that does not include the drivetrain 116. In either embodiment, the motor 104*a* may be configured to transfer power to the drivetrain 116 or to the rear wheel 128 via a gearbox. The motor 104*a* is fixedly engaged to either the drivetrain 116 or to the rear wheel 128 (whether directly or indirectly), meaning that the motor 104*a* cannot be selectively disengaged from the drivetrain 116 or from the rear wheel 128, respectively. This may be, for example, because the pedelec 100 does not comprise a motor clutch permitting such selective disengagement of the motor 104*a* from the drivetrain 116 or the rear wheel 128.

In other embodiments, a small motor 104*b* may be fixedly engaged to the drivetrain 116 (nearer the pedals 120 than the motor 104*a*). Here again, the description of the motor 104*b* as being fixedly engaged to the drivetrain means that the motor 104*b* cannot be selectively disengaged from the drivetrain 116. Again, this may be, for example, because the pedelec 100 does not comprise a motor clutch permitting such selective disengagement of the motor 104*b* from the drivetrain 116.

The motor 104*b* transfers power to the drivetrain 116, which in turn transfers that power to the rear wheel 128 via the drivetrain 116, thus enabling the motor 104*b* to drive the rear wheel 128. As ordinarily skilled artisans will recognize based upon the present disclosure, a motor 104 may be placed elsewhere on the pedelec 100 and provided with a force transmission path that enables the motor 104 to drive the rear wheel 128.

The motor 104 is powered by a battery 132 and controlled by a motor controller 136, both of which may be secured to the frame 108 in a convenient location, and both of which may be in electrical communication with each other and with the motor 104. The controller 136 may control, for example, the flow of electricity from the battery 132 to the motor 104. Thus, the controller 136 may cause the motor 104 to drive the drivetrain (in combination with the pedaling of the user) when the user is pedaling based upon a user's desired level of motor support, as indicated using the motor support level selector 140, and stop the motor 104 from driving the drivetrain when the user stops pedaling, or when the amount of remaining battery charge reaches a predetermined minimum threshold. The controller 136 may receive one or more user inputs from the motor support level selector 140, which may be positioned on or near the handlebars 112, or on or near the battery 132, or elsewhere on the pedelec 100. In some embodiments, the user settings available to be selected by the motor support level selector 140 include high, medium, low, and off. The controller 136 may also receive signals from one or more sensors (such as those described below) positioned in various locations on the pedelec 100, which signals may be used by the controller 136 as inputs for controlling the amount of electricity provided to the motor 104 from the battery 132. Additional functions and features of the controller 136 are described below.

The motor support level selector 140 may enable a user of the pedelec 100 to control the desired level of support to be provided by the motor 104, and the controller 136 may then cause the motor 104 to output a corresponding amount of power to the drivetrain 116. The motor support level selector 140 be any known multiple-position switch (e.g., so as to be switchable among at least between on and off, and in some embodiments among a position corresponding to a higher support level, a position corresponding to a lower support level, and an off position). By adjusting the motor support level selector 140, the user may indirectly control the speed and/or torque output of the motor 104 (e.g., because the controller 136 will control the speed and/or torque output of the motor 104 based on the selected motor support level).

The present disclosure may also be adapted for use on a moped, where the moped motor is not configured to drive a moped wheel directly. In such embodiments, the moped's throttle (which may be, for example, a thumb twist throttle, a half-twist throttle, a full-twist throttle, or any other type of throttle) may be used to control the speed and/or torque output of the moped motor. In some such embodiments, the throttle may also be used to select, for example, whether to use the motor to provide pedal assist (e.g., to reduce the amount of work that the user must do to pedal the moped at a desired speed) or to propel the moped without any pedaling by the user. A pedal assist mode of operation may not be available in some embodiments of the present disclosure, while in other embodiments a motor-only propulsion mode of operation may not be available.

The battery 136 may be one or more of any type of battery, including, for example, a lithium ion battery or a nickel-cadmium battery. The battery can be rechargeable, thus receiving charge power from a source such as an electrical connection to the power grid or through one or more electromechanical systems in the pedelec 100.

Also included in the pedelec 100 is a pedal clutch 144. The pedal clutch 144 causes the pedals 120 to be engaged with the drivetrain 116 when the user is pedaling, disengaged from the drivetrain 116 when the user is not pedaling. For example, when the motor 104 is being used to propel the pedelec 100, the pedal clutch 140 may be operated to disengage the pedals 120 from the drivetrain 116, so that the motor 104 does not drive the pedals 120. In addition to the inefficiency that would result from the motor 104 driving the pedals 120 while also propelling the pedelec 100, engagement of the pedals 120 with the drivetrain 116 while the motor 104 is propelling the pedelec 100 could result in a compromised user safety, as the motor 104 may drive the pedals 120 at a speed faster than the user can rotate his or her feet with the pedals 120. Accordingly, the pedal clutch 144 improves the safety of the pedelec 100 while also providing efficiency benefits.

Figure 2:
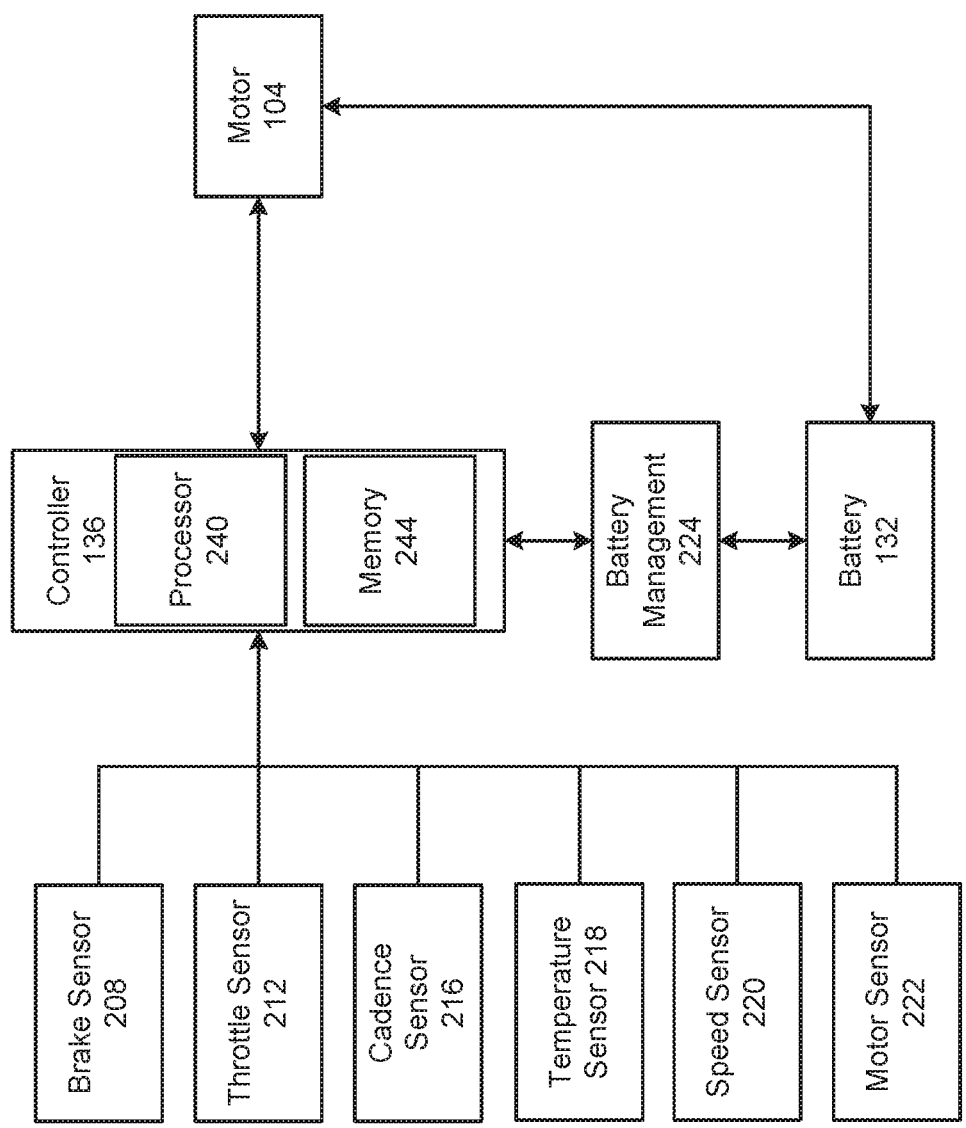
FIG. 2 shows an electromechanical system in accordance with embodiments of the present disclosure.

FIG. 2 is a block diagram of an electrical system 200 that may be used on pedelecs such as the pedelec 100 in accordance with some embodiments of the present disclosure. The electrical system 200 may include, but is not limited to, a controller 136, a brake sensor 208, a motor support level sensor 212, a cadence sensor 216, a temperature sensor 218, a speed sensor 220, a motor sensor 222, a battery management unit 224, a battery 132, and a motor 104. The controller 136 may include a processor 240, which may be any kind of processor, application-specific integrated circuit (ASIC), field-programmable gate array (FPGA), or other device capable of performing the functions described herein. In some embodiments, the controller 136 may control multiple such processors. The controller 136 may also comprise a memory 244 storing instructions for execution by the processor 240 and/or data for use by the processor 240. In some embodiments, the controller 136 may be specially programmed for conducting the methods and processes described herein, while in other embodiments the controller 136 may download programming, firmware, etc. from a memory that is separate and physically distinct from the controller 136. The controller 136 can interface with the sensors 208 through 222 and with the battery management unit 224 using one or more communication protocols. The controller 136 may control the motor 104 by selectively controlling gates that control the windings of the motor 104. The gates are not shown herein, but may be as understood in the art. The controller 136 may operate using power from the battery 132, and/or the controller 136 may have a dedicated battery or back-up battery that is configured to provide electricity only to the controller 136 (and not to the motor 104).

The one or more sensors 208 through 222 can sense different operating characteristics or context of the pedelec 100. Additionally, the one or more sensors 208 through 222 may provide analog and/or digital signals to the controller 136 corresponding to a particular measured or sensed characteristic. For example, the brake sensor 208 may provide a signal to the controller 136 that corresponds to whether braking is being conducted by the user (whether through a brake lever or some other type of mechanical or electromechanical system). The brake sensor 208 may also provide, in the same electrical signal or in a different electrical signal, information about the amount of braking being conducted. In some embodiments, when the controller 136 receives a signal from the brake sensor 208 indicating that braking is being conducted, the controller 136 may stop the flow of electricity from the battery 132 to the motor 104, whether by sending a signal to the battery management unit 224 or interrupting the flow of electricity to the motor 104 from the battery 132 or otherwise. Because a bicycle rider typically does not pedal and brake at the same time, stopping the flow of electricity to the motor 104 during braking is unlikely to have a negative effect on the user of the pedelec 100. On the other hand, stopping the flow of electricity to the motor 104 during braking will conserve battery power for later use, while also enhancing braking of the pedelec 100.

The motor support level sensor 212 senses the motor support level selector position selected by the user via the motor support level selector 140 in the handlebar 112 (or elsewhere on the pedelec 100). In some embodiments, the motor support level sensor 212 is a transducer that generates an electrical signal based on a physical position of the motor support level selector 140. The motor support level sensor 212 provides this or another electrical signal corresponding to the amount of support requested by the user to the controller 136. In some embodiments (e.g. embodiments of the present disclosure implemented on a moped rather than a pedelec), a throttle sensor may determine (based, e.g., on a user input provided via the moped throttle) whether the user is requesting no power, pedal assist or full drive from the moped motor.

The cadence sensor 216 senses the rotations per minute of the pedals 120, and provides a corresponding electrical signal to the controller 136. In some embodiments, the cadence sensor 216 (or another sensor) may be configured to also sense an amount of force or an amount of power input by the user to the pedals 216, and to provide a corresponding electrical signal to the controller 136. Based on the sensed rotations per minute of the pedals 120 and/or the sensed amount of force or amount of power input by the user, the controller 136 may determine whether the user is using the pedals 120. For example, if the cadence sensor 216 senses that the rotations per minute of the pedals 120 are at or near zero, or that the amount of force or the amount of power input to the pedals 120 is at or near zero, then the controller 136 may determine that the user is not using the pedals 120.

The temperature sensor 218 may be positioned within the motor 104 and senses the motor winding temperature. The temperature sensor 218 may provide a signal corresponding to the motor winding temperature to the controller 136. When the winding temperature gets too high (e.g., when the motor winding temperature surpasses 75 degrees Celsius, or 80 degrees Celsius, or 85 degrees Celsius) the controller 136 may depower the motor 104 to prevent permanent damage. In some embodiments, the controller 136 may, upon determining that the winding temperature is approaching a predetermined limit, cause a gradual reduction in the speed or power output of the motor 104, until causing the motor 104 to altogether cease contributing to the propulsion of the pedelec 100 when the predetermined temperature limit is reached. The use of a temperature sensor 218 to monitor the motor winding temperature, together with the controller 136 to control the motor 104 based on the motor winding temperature, may beneficially prolong a user's ride experience under high power usage and/or environmentally hot conditions.

The speed sensor 220 may be used to measure the speed of a pedelec 100. The speed sensor 220 may be integrated into the front wheel 124, the rear wheel 128, or some other suitable location on the pedelec 100 (e.g., on or near a rotating component having a rotation speed from which a forward speed of the pedelec 100 may be determined). The speed sensor 220 (or the controller 136, based on information received from the speed sensor 220) may be calibrated to determine the straight-line speed of the pedelec 100 based on the sensed information. The controller 136 may use the determined speed of the pedelec 100 to ensure that the motor 104 is not used to propel the pedelec 100 at speeds beyond a predetermined limit (which may be determined, for example, by law or regulation). Moreover, based on the determined speed of the pedelec 100, the controller 136 may cause a gradual reduction in the speed or power output of the motor 104 as the pedelec 100 reaches a predetermined maximum speed, so that when the predetermined maximum speed is reached, the motor 104 is not contributing to propulsion of the pedelec 100. This gradual reduction in power output by the motor 104 beneficially eliminates the common scenario in prior art pedal electric bikes where the motor cuts out suddenly when a predetermined maximum speed is reached, resulting in a significant step increase in the amount of work that the rider must input to the pedal electric bike to keep the bike moving at that speed.

The motor sensor 222 can measure the amount of torque being produced by the motor 104, as well as information about a phase shift, RPM, and/or other operating characteristics of the motor 104. In some embodiments, the motor sensor 222 may comprise one or more sensors located on or within the motor 104, with each such sensor configured to measure a particular operating characteristic of the motor 104. The motor sensor 222 may also be configured to calculate one or more values (e.g., torque) based on measured values. Information measured and/or calculated by the motor sensor 222 may be provided via one or more electrical signals to the controller 136.

A battery management unit 224 can analyze either analog or digital data provided by or obtained from the battery 224. The battery management unit 224 can determine the charge of the battery 132, the amount of power being provided by the battery 132, and/or other battery performance and battery health information. Further, the battery management unit 224 can receive inputs from the controller 204 to change the function or to conduct some other operation of the battery 132. In some embodiments, when the battery management unit 224 detects that the battery 132 has reached a predetermined low charge threshold, the battery management unit 224 may send a signal to the controller 136, which may in turn cause a gradual reduction in the speed or power output of the motor 104, until the motor 104 ceases to contribute to the propulsion of the pedelec 100. Here again, this gradual reduction in power output by the motor 104 beneficially eliminates the common scenario in prior art pedal electric bikes where the motor cuts out suddenly when battery charge is exhausted, resulting in a significant step increase in the amount of work that the rider must input to the pedal electric bike to keep the bike moving.

The predetermined low charge threshold of the battery 132 referenced above may be greater than the lowest safe charge level of the battery 132. In some embodiments of the present disclosure, the battery 132 may lose the ability to be safely recharged if the overall charge level drops below a certain percentage (e.g., 10%). In accordance with some embodiments of the present disclosure, the battery management unit 224 may signal the motor controller 136 when the battery 132 reaches the predetermined low charge threshold of the battery 132 (e.g., 15%), and the motor controller 136 may thereafter prevent use of the motor 104 at any torque output level other than the minimal torque level necessary to overcome the internal resistance of the motor 104. In some embodiments, for example, the motor controller 136 may operate the motor 104 only at the minimum torque level (which level may vary depending on the amount of internal resistance of the motor at a given moment in time) once the low charge threshold is reached. This ensures that the battery 132 will have sufficient power to run the motor 104 at the minimum torque level (which requires very little electricity, such as 10 watts or less) for an extended period of time, and thus enables a cyclist to continue to use the pedelec 100 without any noticeable effect of the motor 104 on pedaling resistance, even with the motor 104 fixedly engaged to the drivetrain 116. Of course, once the lowest safe charge level of the battery 132 is reached, then electricity flow from the battery 132 for any purpose may be discontinued.

Figure 3:
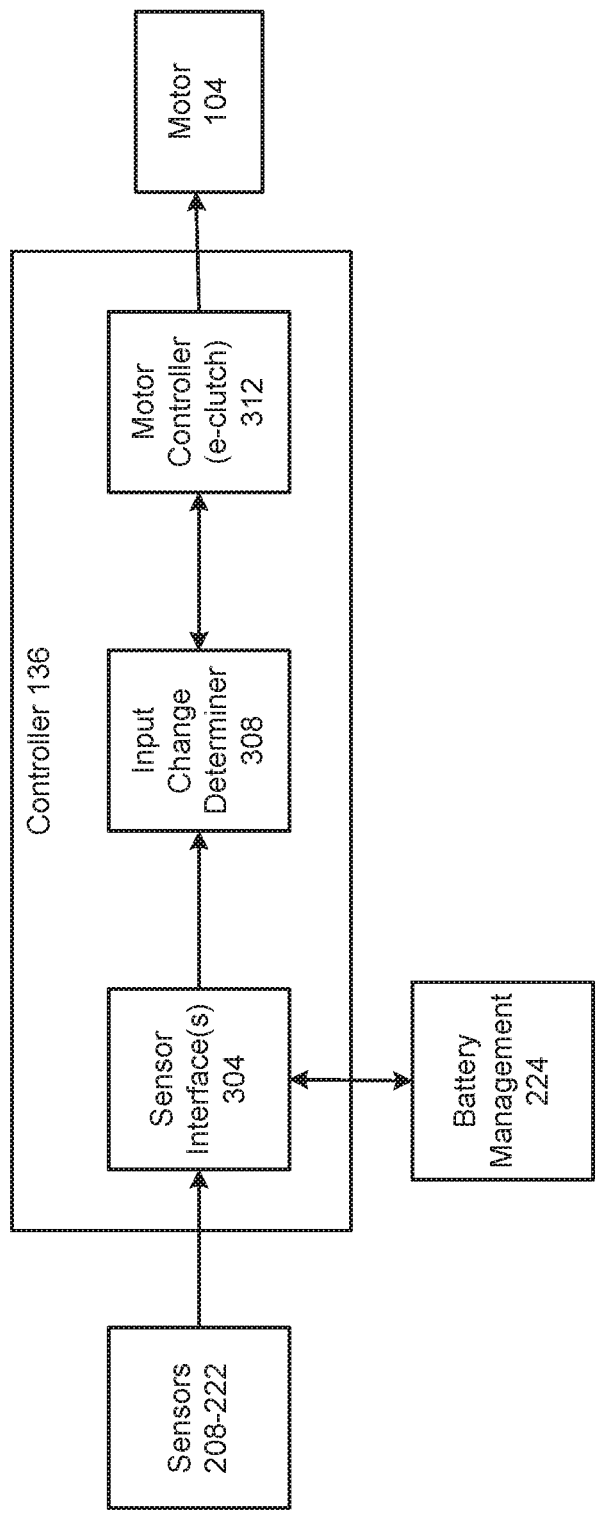
FIG. 3 is a diagram of a motor controller in accordance with embodiments of the present disclosure.

FIG. 3 provides another block diagram of the controller 136. The components of the controller 136 as illustrated in FIG. 3 may include one or more of, but are not limited to, one or more sensor interface(s) 304, an input change determiner 308, and a motor controller or e-clutch 312. Notably, while FIG. 3 does not explicitly show the controller 136 as comprising a processor or memory, the input change determiner 308 and the motor controller 312 may be implemented in or by a processor executing instructions stored in memory. Additionally or alternatively, one or both of the input change determiner 308 and the motor controller 312 may comprise dedicated hardware, software, or a combination of hardware and software. For example, one or both of the input change determiner 308 and the motor controller 312 may be or comprise a processor and memory, an ASIC, or an FPGA.

The sensor interface(s) 304 receive electrical signal inputs from the sensors 208-222, which electrical signal inputs comprise sensed information (and/or calculated information based on sensed information) about one or more of, for example, braking of the pedelec 100, the position of a motor support level selector 140 of the pedelec 100, the rotations per minute of the pedals 120 of the pedelec 100, the speed of the pedelec 100, and/or the torque output by the motor 104 of the pedelec 100. The sensor interface(s) 304 may comprise software and/or hardware as necessary to convert signals received from the sensors 208-222 in one or more first formats into a second format (or into one or more second formats) suitable for use by the input change determiner 308. In some embodiments, the input change determiner 308 may comprise the sensor interface(s) 304.

The input change determiner 308 receives the electrical signal inputs from the one or more sensors 208 through 222 via the sensor interface(s) 304. For example, the input change determiner 308 may receive information about braking of the pedelec 100 by the user thereof. The input change determiner 308 may receive information about a position of the motor support level selector 140 selected by the user of the pedelec 100. The input change determiner 308 may receive information about the cadence of the pedals 120 of the pedelec 100, and/or about the speed of the pedelec 100. The input change determiner 308 may receive information about the torque output of the motor 104, and/or about a current state of the battery 132. The input change determiner 308 may analyze any such current context information received via the sensor interface(s) 304, and may compare any such current context information with stored context information to determine whether any change in context has occurred. For example, the input change determiner 308 may use the current context information to determine whether any changes have been made or have occurred with respect to the operation of the pedelec 100 (e.g., whether the context of the pedelec 100 has changed) that require an adjustment to the function of the pedelec 100 (or more specifically, of the motor 104) by the motor controller 312.

The motor controller 312 comprises an e-clutch system. The e-clutch system can ensure that when use of the motor 104 for propelling the pedelec 100 is discontinued, the motor 104 continues to produce enough torque to eliminate or nearly eliminate the influence of the motor 104 on the pedaling resistance that the user feels when pedaling the pedelec 100. As such, the motor controller 312 can receive change information from the input change determiner 304 regarding a change in the operation of the pedelec 100 (e.g., a change in the context of the pedelec 100), and based on that information may adjust the functioning of the motor 104. Changes that may cause the motor controller 312 to adjust the functioning of the motor 104 can include a user deciding to pedal the pedelec 100 (as indicated by an increase in the cadence of the pedals 120 from at or near zero to a non-zero number), the speed of the pedelec 100 exceeding some predetermined threshold, the speed of the pedelec 100 dropping below some predetermined threshold, or activation of the brakes of the pedelec 100. Further, the motor controller 312 can change the function of the motor 104 if the battery 132 is below some predetermined charge limit (e.g., below fifteen percent (15%) of total charge). Whenever the motor 104 is not being used for forward propulsion of the pedelec 100 and the cadence of the pedals 120 of the pedelec 100 is non-zero (or above a predetermined non-zero threshold), the motor controller 312 can cause the motor 104 to function at very low torque that is insufficient to impart forward motion to the pedelec 100 but that is sufficient to overcome the internal resistance of the motor 104 to rotation, such that the motor 104 does not add any resistance to the user's pedaling of the pedelec 100. As a result, the user of the pedelec 100 does not have to exert extra effort to pedal even though the motor 104 is not physically disengaged from the drivetrain 116.

Figure 4:
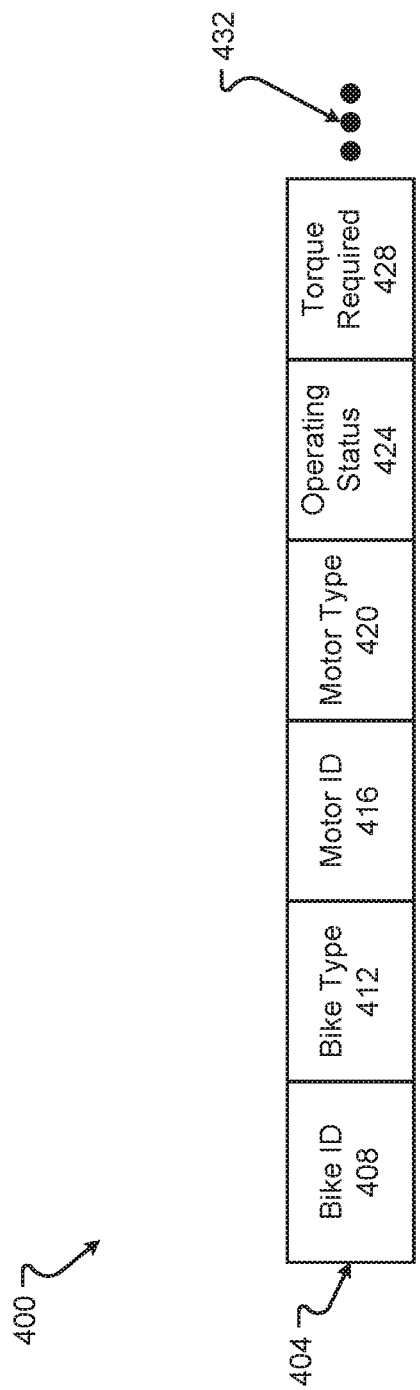
FIG. 4 is a block diagram of a data structure in accordance with embodiments of the present disclosure.

FIG. 4 diagrams data 400 that may be used by the motor controller 312 to determine how to control the motor 104. The data 400 can include a data structure 404 with one or more fields. The fields can include a bike identifier 408, a bike type 412, motor identifier 416, motor type 420, an operating status 424, and a torque requirement 428. There may be more or fewer data fields in data structure 404, as represented by ellipses 432.

The bike identifier 408 can be any type of unique identifier that defines the bike. This bike identifier can include an alphanumeric, numeric, globally unique identifier, or other types of identifiers. The bike ID 408 provides the controller 204 with information about the type of bike or arrangement of systems in the pedelec 100.

The bike type 412 can include information for the controller 136 to determine how to control the motor 104 to produce the desired amount of torque and/or information about what may be the appropriate torque amount for the pedelec 100 based on the operating status 424 of the pedelec 100.

The motor ID 416 can be any type of ID similar to the bike ID. For example, the motor ID can be a GUID, an alphanumeric ID, numeric ID, or some other type of ID that identifies the motor 104. The motor ID may allow a processor 240 of the controller 136 or the motor controller 312 of the controller 136 to locate and extract, from a memory 240 or other memory within the controller 136, information about the motor 104 and how to control the motor 104.

The operating status 424 can include information that allows the motor controller 312 to determine how to operate the motor 104. For example, if the operating status 424 reflects that a user of the pedelec 100 has configured the motor support level selector 140 to request a high level of support, then the motor controller 312 can control the motor 104 accordingly. The operating status 424 may reflect, for example, the RPM of the pedals 120 and/or of the motor 104; whether the user is braking the pedelec 100; a position of the motor support level selector 140; a speed of the pedelec 100; a torque output of the motor 104; the RPM of the motor 104; and/or a charge level of the battery 132.

If the operating status 424 reflects that the user is braking the pedelec 100, then the motor controller 312 may stop the flow of electricity to the motor 104 or reduce the torque output of the motor 104 for the duration of the braking. Additionally, if the braking ends when the speed of the pedelec 100 is at or near zero, the motor controller 312 may not restore the flow of electricity to the motor 104 until receiving an input via pedals 120. This ensures that, for example, if a user of the pedelec 100 brakes to a stop at a stop sign or stoplight, the motor 104 does not immediately cause the pedelec 100 to accelerate once the brakes are released.

If the operating status 424 reflects that the user is pedaling and that the motor 104 is not being used for forward propulsion purposes (e.g., is not transferring power to the drivetrain 116 of the pedelec 100), the motor controller 312 may cause the motor 104 to function at very low torque that is insufficient to impart forward motion to the pedelec 100 but that is sufficient to overcome the internal resistance of the motor 104 to rotation, such that the motor 104 does not add any resistance to the user's pedaling of the pedelec 100. As a result, the user of the pedelec 100 does not have to exert extra effort to pedal even though the motor 104 is not physically disengaged from the drivetrain 116.

The torque required information 428 can be information that describes the amount of torque required to overcome the resistance of the motor when the user is pedaling. The information may be obtained, for example, from a look-up table that correlates RPM (whether of the motor 104 or of the pedals 120) with an amount of torque required (or an amount of electricity that must be provided to the motor 104) to overcome the resistance of the motor at that RPM. Thus, for example, if the unpowered motor 104 is being driven by the drivetrain 116 at 20 RPM (e.g., because the user is pedaling), then a look-up table as described above may be used to identify the amount of torque required to overcome the internal resistance of the motor 104 at 20 RPM, and/or to identify the amount of electricity that must be provided to the motor 104 to overcome the internal resistance of the motor 104 at 20 RPM. Such a look-up table beneficially allows the motor 104 to be operated at just the right power level to overcome the internal resistance thereof, without unnecessarily using any extra electricity to drive the motor 104 and also without causing the motor 104 to propel the pedelec 100 (or contribute to the propulsion of the pedelec 100).

The values contained in such a look-up table may be determined based on information provided by the manufacturer of the motor 104, or by testing conducted by the manufacturer of the pedelec 100, or otherwise. Regardless of how the information is obtained, the look-up table or an alternative data structure that enables determination of the appropriate power and/or torque requirements for overcoming the resistance of the motor at various RPMs may be stored in a memory 244 or any other memory of the controller 136.

In some embodiments, the torque included in the torque required 428 may be given as an angle differentiation between the winding of the stator compared to the winding of the rotor. As such, the amount or difference in that angle can influence the amount of torque. Further, the torque may also be an amount of current applied to the stator to produce the electric field that attracts the rotor in generating the physical power.

Figure 5:
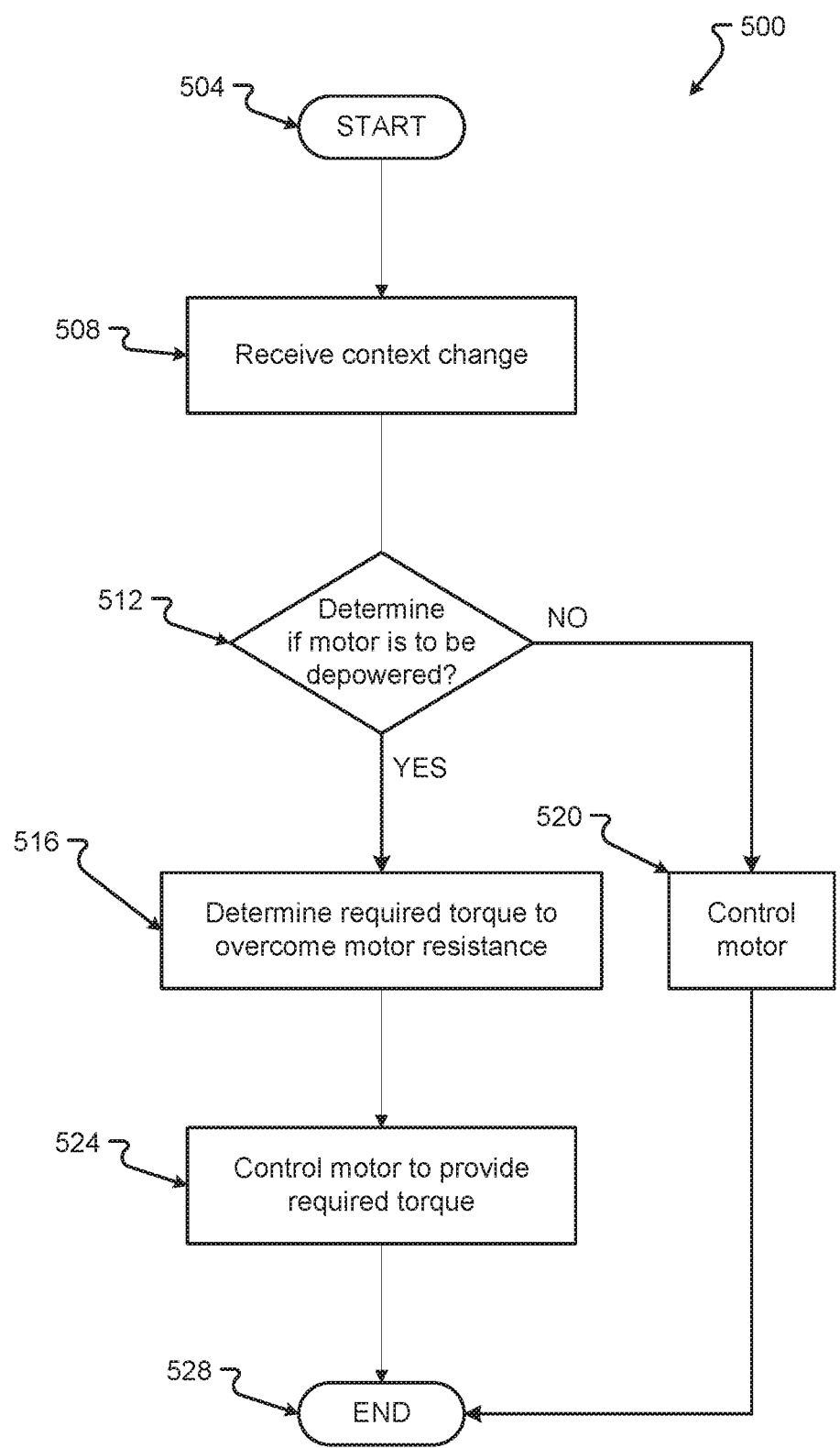
FIG. 5 is a block diagram describing a method of controlling a pedelec motor in accordance with embodiments of the present disclosure.

An embodiment of a method 500 for controlling the motor 104 in the pedelec 100 is illustrated in FIG. 5. Once the method 500 begins (step 504), the controller 136 may receive from one or more sensors 208-222 and/or from the battery management unit 224 information about a context change of the pedelec 100 (step 508). Alternatively, the controller 136 may determine that a context change of the pedelec 100 has occurred based on information from the one or more sensors 208-222 and/or from the battery management unit 224. The context change can be a change from power-assist riding (e.g., where the pedelec 100 is propelled both by the motor 104 and by the user via the pedals 120) to non-powered riding (e.g., where the pedelec 100 is propelled solely by the user via the pedals 120). For example, a motor support level sensor 212 can send information to the controller 136 indicating that the user has adjusted the motor support level selector 140 to an "off" position, such that the motor support is no longer requested. The context change can also be that the user began to pedal the pedelec 100, and/or that the speed of the pedelec 100 changed from zero to a non-zero number, or vice versa. In other embodiments, a cadence sensor 216 can determine that the user has begun to pedal and no longer desires to use the motor 104. In other embodiments, the speed sensor 220 can indicate that a predetermined maximum speed has been reached, such that the motor 104 may not be used to further propel the pedelec 100 (meaning, of course, that the user must provide any additional needed propulsion via the pedals 120). Any of the context changes can provide the controller 136 with information as to how to control the motor 104. Additionally or alternatively, the controller 136 may be configured to determine how to control the motor 104 based on a given context or context change.

Based on the context change received in step 508, the controller 136 may determine if the motor 104 is to be depowered (step 512). Depowering the motor 104 refers to stopping use of the motor 104 to transfer power to the drivetrain 116 for the purpose of propelling the pedelec 100. The motor 104 may be depowered in response to any context change indicating that the user no longer wishes to use the motor 104 to assist with forward propulsion, and/or any context change indicating that the motor 104 may no longer be used to assist with forward propulsion (e.g., because the battery has reached a predetermined minimum charge threshold, or because a predetermined maximum speed limit has been reached). If the motor is to be depowered, the method 500 proceeds to step 516, where the amount of torque needed to overcome the internal resistance of the motor is determined. In contrast, if the motor is not to be depowered, the method 500 proceeds to step 520, where the controller 136 continues (or begins) to control the motor 104 in a powered state based on the position of the motor support level selector 140 and/or other context information (e.g., braking action, speed, cadence). In other words, the motor 104 may continue to be used to assist in powering the forward motion of the pedelec 100 by transferring power to the drivetrain 116, with electricity being supplied by the battery 132 to the motor 104 to enable the motor 104 to produce the needed power.

In step 516, the controller 136 can determine the required torque in order to limit or eliminate the amount of friction and/or resistance imposed by the motor 104 on the drivetrain 116 and thus on the user's pedaling. Here, the controller 136 may obtain or extract data, such as in data structure 404, to determine the torque required or to look up the amount of torque required based on the motor type 420, bike type 412, bike ID 408, motor ID 416, and/or operating status 424. As described above, this information may be used to determine the amount of torque required to provide zero resistance from the motor 228 to the user while pedaling the pedelec 100.

Once the amount of torque is determined, the controller 136 can control the motor to provide that required torque in step 524. Here, the controller can send signals to the motor 104 or the battery management system 224 to provide the proper amount of amperage and torque angle to the motor 104 to ensure that the amount of torque provided is just enough to overcome the resistance of the motor to the pedaling of the user.

Any of the steps, functions, and operations discussed herein can be performed continuously and automatically.

The systems and methods of this disclosure have been described in relation to a pedal electric bicycle system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

While the flowcharts and block diagrams have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Hardware that can be used for the present disclosure includes, for example, computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a pedal-electric bicycle, comprising: a set of pedals; a drive wheel; a drivetrain configured to transfer power from the set of pedals to the drive wheel; a pedal clutch for selectively disengaging the set of pedals from the drivetrain; a motor, the motor in fixed engagement with the drivetrain and configured to selectively transfer power to the drivetrain; and a motor controller configured to selectively operate the motor at a minimum torque level when the drivetrain is transferring power from the set of pedals to the drive wheel and the motor is not transferring power to the drivetrain.

Aspects of the above pedal-electric bicycle include wherein the minimum torque level is a torque level sufficient to overcome an internal resistance of the motor; wherein the motor controller comprises a memory that stores a look-up table containing information about the minimum torque level; a battery for providing electricity to the motor; wherein the motor controller is configured to operate the motor at the minimum torque level if a charge level of the battery reaches a predetermined minimum charge level; wherein the predetermined minimum charge level is higher than the lowest safe charge level of the battery a speed sensor configured to transmit speed information to the motor controller; a cadence sensor configured to transmit cadence information to the motor controller; a motor support level sensor configured to transmit motor support level information to the motor controller; a brake sensor configured to transmit braking information to the motor controller; a motor sensor configured to transmit motor information to the motor controller; and a battery management unit configured to transmit battery information to the motor controller.

Embodiments also include a method of operating a motor of a pedal-electric bicycle, comprising: receiving, at a motor controller, information about a change in context of a pedal-electric bicycle; determining, with a processor of the motor controller and based on the received information, that a motor of the pedal-electric bicycle is to be depowered; determining, based on information stored in a memory of the motor controller and with the processor of the motor controller, a minimum torque level required to overcome an internal resistance of the motor; and causing the motor to operate at the minimum torque level.

Aspects of the above method of operating a motor of a pedal-electric bicycle include wherein the pedal-electric bicycle comprises a drivetrain configured to transfer power from a set of pedals and a motor to a drive wheel, the set of pedals selectively disengageable from the drivetrain, the motor fixedly engaged to the drive train; wherein the information about a change in context of the pedal-electric bicycle comprises information about braking of the pedal-electric bicycle, a position of a motor support level selector of the pedal-electric bicycle, a cadence of a set of pedals of the pedal-electric bicycle, a motor winding temperature within the motor of the pedal-electric bicycle, a speed of the pedal-electric bicycle, a charge state of a battery of the pedal electric bicycle, or the motor of the pedal-electric bicycle; wherein the information about a change in context of the pedal-electric bicycle corresponds to information sensed by a brake sensor, a motor support level sensor, a cadence sensor, a temperature sensor, a speed sensor, a motor sensor, or a battery management unit; wherein the information about a change in context of the pedal-electric bicycle corresponds to information sensed by the motor sensor, and the information sensed by the motor sensor comprises a motor RPM; wherein the motor comprises a direct current, brushless, slotless motor; and wherein the information stored in the memory of the motor controller is a look-up table that correlates motor RPM with minimum torque levels.

Embodiments also include a pedal-electric bicycle e-clutch, comprising: a processor; and a memory storing instructions for execution by the processor that, when executed, cause the processor to: receive context information from a braking sensor, a motor support level sensor, a cadence sensor, a speed sensor, or a battery management unit of a pedal-electric bicycle; determine, based on the context information, that a context of the pedal-electric bicycle has changed; cause a motor of the pedal-electric bicycle to stop transferring power to a drivetrain of the pedal-electric bicycle, the motor fixedly engaged to the drivetrain; identify, using a look-up table stored in the memory, a minimum torque level necessary to overcome an internal resistance of the motor; and cause the motor to operate at the minimum torque level.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

Examples of processors as referenced herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJ-S™ processors. A processor as disclosed herein may perform computational functions using any known or future-developed standard, instruction set, libraries, and/or architecture.

What is claimed is:

1. A pedal-electric bicycle, comprising:
    a set of pedals;
    a drive wheel;
    a drivetrain configured to transfer power from the set of pedals to the drive wheel;
    a pedal clutch for disengaging the set of pedals from the drivetrain;
    a motor, the motor in fixed engagement with the drivetrain and configured to selectively transfer power to the drivetrain; and
    a motor controller configured to selectively operate the motor at a minimum torque level when the drivetrain is transferring power from the set of pedals to the drive wheel and the motor is not transferring power to the drivetrain.

2. The pedal-electric bicycle of claim 1, wherein the minimum torque level is a torque level sufficient to overcome an internal resistance of the motor.

3. The pedal-electric bicycle of claim 2, wherein the motor controller comprises a memory that stores a look-up table containing information about the minimum torque level.

4. The pedal-electric bicycle of claim 1, further comprising a battery for providing electricity to the motor.

5. The pedal-electric bicycle of claim 4, wherein the motor controller is configured to operate the motor at the minimum torque level if a charge level of the battery reaches a predetermined minimum charge level.

6. The pedal-electric bicycle of claim 5, wherein the predetermined minimum charge level is higher than a lowest safe charge level of the battery.

7. The pedal-electric bicycle of claim 1, further comprising a speed sensor configured to transmit speed information to the motor controller.

8. The pedal-electric bicycle of claim 1, further comprising a cadence sensor configured to transmit cadence information to the motor controller.

9. The pedal-electric bicycle of claim 1, further comprising a motor support level sensor configured to transmit motor support level information to the motor controller.

10. The pedal-electric bicycle of claim 1, further comprising a brake sensor configured to transmit braking information to the motor controller.

11. The pedal-electric bicycle of claim 1, further comprising a motor sensor configured to transmit motor information to the motor controller.

12. The pedal-electric bicycle of claim 1, further comprising a battery management unit configured to transmit battery information to the motor controller.

13. A method of operating a motor of a pedal-electric bicycle, comprising:
    receiving, at a motor controller, information about a change in context of the pedal-electric bicycle;
    determining, with a processor of the motor controller and based on the received information, that the motor of the pedal-electric bicycle is to be depowered;
    determining, based on information stored in a memory of the motor controller and with the processor of the motor controller, a minimum torque level required to overcome an internal resistance of the motor; and
    causing the motor to operate at the minimum torque level.

14. The method of claim 13, wherein the pedal-electric bicycle comprises a drivetrain configured to transfer power from a set of pedals and the motor to a drive wheel, the set of pedals selectively disengageable from the drivetrain, the motor fixedly engaged to the drivetrain.

15. The method of claim 13, wherein the information about a change in context of the pedal-electric bicycle comprises information about braking of the pedal-electric bicycle, a position of a motor support level selector of the pedal-electric bicycle, a cadence of a set of pedals of the pedal-electric bicycle, a motor winding temperature within the motor of the pedal-electric bicycle, a speed of the pedal-electric bicycle, a charge state of a battery of the pedal electric bicycle, or the motor of the pedal-electric bicycle.

16. The method of claim 13, wherein the information about a change in context of the pedal-electric bicycle corresponds to information sensed by a brake sensor, a motor support level sensor, a cadence sensor, a temperature sensor, a speed sensor, a motor sensor, or a battery management unit.

17. The method of claim 16, wherein the information about a change in context of the pedal-electric bicycle corresponds to information sensed by the motor sensor, and the information sensed by the motor sensor comprises a motor RPM.

18. The method of claim 13, wherein the motor comprises a direct current, brushless, slotless motor.

19. The method of claim 13, wherein the information stored in the memory of the motor controller is a look-up table that correlates motor RPM with minimum torque levels.

20. A pedal-electric bicycle e-clutch, comprising:
a processor; and
a memory storing instructions for execution by the processor that, when executed, cause the processor to:
receive context information from a braking sensor, a motor support level sensor, a cadence sensor, a speed sensor, or a battery management unit of the pedal-electric bicycle;
determine, based on the context information, that a context of the pedal-electric bicycle has changed;
cause a motor of the pedal-electric bicycle to stop transferring power to a drivetrain of the pedal-electric bicycle, the motor fixedly engaged to the drivetrain;
identify, using a look-up table stored in the memory, a minimum torque level necessary to overcome an internal resistance of the motor; and
cause the motor to operate at the minimum torque level.

* * * * *